United States Patent Office 2,964,530
Patented Dec. 13, 1960

2,964,530

3-ALKYL-4-HYDROXYMETHYL-4-ALKYLOXAZOLIDINES

Bernard L. Zenitz, Colonie, N.Y., assignor to Sterling Drug, Inc., New York, N.Y., a corporation of Delaware No Drawing. Original application May 2, 1958, Ser. No. 732,436. Divided and this application Oct. 20, 1958, Ser. No. 771,695

8 Claims. (Cl. 260—307)

This invention relates to intermediate used in the preparation of hydroxylated secondary and tertiary amines, and in particular it is concerned with intermediate used in the preparation of N-monoalkyl- and N,N-dialkyl-N-[bis(hydroxymethyl)lower-alkyl]-amines wherein the compounds have a total of between eighteen and twenty-four carbon atoms, inclusive. The invention also concerns acid-addition salts and methods of preparation of said novel intermediates.

The hydroxylated secondary and tertiary amines prepared from the compounds of my invention are represented by the following structural formula:

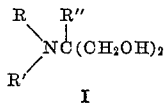

I wherein R represents a hydrogen atom or an alkyl radical, R' represents an alkyl radical, R'' represents a lower-alkyl radical, and the sum of the number of carbon atoms in R, R' and R'' is between fifteen and twenty-one, inclusive.

The exact nature of the alkyl radicals represented by R, R' and R'' is not critical, the only critical feature being the total carbon content of the molecule. Thus when R or R' are alkyl radicals they can be any of such straight chained or branched chained groups as methyl, ethyl, propyl, isopropyl, butyl, isobutyl, secondary-butyl, tertiary-butyl, pentyl, isopentyl, hexyl, isohexyl, heptyl, octyl, isooctyl, nonyl, decyl, undecyl, dodecyl, tridecyl, tetradecyl, hexadecyl, octadecyl, and the like. R'', in representing a lower-alkyl radical, preferably has from one to about six carbon atoms, and thus can be any of such radicals as methyl, ethyl, propyl, isopropyl, butyl, isobutyl, pentyl, hexyl, and the like. A particularly preferred class of compounds are those in which R'' represents the methyl radical.

The compounds of Formula I are prepared by reacting a Grignard reagent, R'''Mg-halide, with a compound having the formula

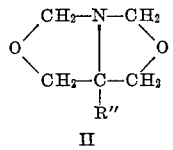

II or

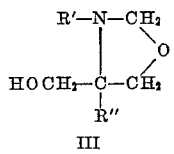

III

The compounds of the present invention are represented by Formula III. In the Grignard reagent, R'''Mg-halide, R''' represents an alkyl group having one less carbon atom than the alkyl group R to be introduced in forming compounds of Formula I. The halide is preferably bromide or iodide. If the intermediate II is used, symmetrical compounds of the formula $R_2NC(R'')(CH_2OH)_2$ where both N-alkyl groups are identical, are produced. If the intermediate III is used, compounds of the formula $RR'NC(R'')(CH_2OH)_2$, where R and R' can be the same or different, are produced.

The reaction of R'''Mg-halide with compounds of Formula II or III is carried out under conditions used for Grignard type reactions, for example, in anhydrous ether medium.

The intermediates of Formulas II and III are readily prepared by condensation of formaldehyde with a bis-(hydroxymethyl)lower-alkylamine, $H_2NC(R'')(CH_2OH)_2$ or with a secondary amine, $R'HNC(R'')(CH_2OH)_2$, respectively. The reaction is carried out by heating the formaldehyde and amine in an inert solvent with means for separating the water formed by the condensation from the reaction mixture.

The structures of the compounds of the invention are established by the mode of synthesis and corroborated by chemical analysis.

The invention contemplates the compounds both in the free base form and in the form of acid-addition salts. The preferred acid-addition salts are those which are appreciably water-soluble so that they may be prepared for use in aqueous solution. The oxazolidine of the invention (Formula III) readily form water-soluble salts with conventional acids, such as hydrochloric, hydrobromic, hydriodic, nitric, sulfuric, phosphoric, acetic, propionic, lactic, quinic, phthalic, methanesulfonic, p-toluenesulfonic acids, and the like.

The compounds of Formula I having the designated carbon content have been found to possess bactericidal activity against such organisms as Staphylococcus aureus, Eberthella typhi, Pseudomonas aeruginosa, Aspergillus niger, and the like.

The bactericidal activity was determined in vitro by measuring the minimal concentration necessary to kill the bacteria in 10 minutes, and it was found that the compounds were effective in dilutions ranging from 1:1000 to 1:25,000. They were effective either when dissolved in acid solution, such as aqueous acetic, propionic, quinic or phthalic acids, or when dispersed in neutral aqueous medium by means of a surface active agent.

The compounds are prepared for use by preparing a dilute solution in aqueous acid or a neutral solution containing a surfactant, and applied to a surface to be disinfected by conventional means such as spraying, swabbing, immersion, and the like.

The oxazolidines of Formula III are useful as intermediates in preparing the tertiary amines of Formula I, and the oxazolidines, particularly those in which the sum of the number of carbon atoms in R' and R'' lies between eleven and nineteen, inclusive, are also useful as bactericidal agents.

The following examples will further illustrate the invention without limiting the same thereto.

*Example 1*

(a) *N - (n - decyl) - 2 - methyl - 1,3 - dihydroxy - 2-propylamine* [I; R is H, R' is $CH_3(CH_2)_9$, R'' is $CH_3$].— A mixture of 33.15 g. (0.15 mole) of n-decyl bromide, 45.4 g. (0.375 mole) of 2-amino-2-methyl-1,3-propanediol and 500 ml. of n-butyl alcohol was refluxed for ninety hours. The reaction mixture was cooled, concentrated to remove the solvent, and the residue was poured into 2 liters of ice water. The aqueous mixture was saturated with sodium chloride and extracted three times with ether. The ether extracts were dried over anhydrous calcium sulfate and concentrated, and the residue which crystallized upon cooling was recrystallized from 400 ml. of hexane, giving 27.7 g. of N-(n-decyl)-2-methyl-1,3-dihydroxy-2-propylamine, M.P. 45–46.5° C. (uncorr.). When recrystallized twice from acetone and dried, a sample of the compound was obtained in the form of colorless needles, M.P. 45.6–48.2° C. (corr.).

Analysis.—Calcd. for $C_{14}H_{31}NO_2$: C, 68.52; H, 12.74; N, 5.71. Found: C, 68.83, 68.90; H, 12.70, 12.50; N, 5.71.

(b) 3 - (n - decyl) - 4 - hydroxymethyl - 4 - methyloxazolidine [III; R' is $CH_3(CH_2)_9$, R'' is $CH_3$].—A mixture of 11.1 g. (0.0452 mole) of N-(n-decyl)-2-methyl-1,3-dihydroxy-2-propylamine, 1.41 g. (0.0468 mole) of paraformaldehyde and 100 ml. of dry benzene was refluxed under a water separator for about two and one-half hours after which time about 0.8 ml. of water had been collected. The reaction mixture was concentrated to remove the solvent, and the residue was dissolved in absolute ether and filtered. To the filtrate was added an excess of ethereal hydrogen chloride and the solution was cooled, wehreupon there separated 12.4 g. of crystalline product, M.P. about 70° C. (uncorr.). After two recrystallizations from acetone there was obtained a pure sample of 3-(n-decyl)-4-hydroxymethyl-4-methyloxazolidine in the form of its hydrochloride salt having the M.P. 66.8–71.4° C. (corr.).

Analysis.—Calcd. for $C_{15}H_{31}NO_2 \cdot HCl$: C, 61.30; H, 10.97; Cl, 12.06. Found: C, 61.46; H, 11.03; Cl. 11.90.

(c) N - (n - decyl) - N - butyl - 1,3 - dihydroxy - 2 - methyl-2-propylamine [I; R is $CH_3(CH_2)_3$, R' is $CH_3(CH_2)_9$, R'' is $CH_3$] can be prepared by causing 3 - (n - decyl) - 4 - hydroxymethyl - 4 - methyloxazolidine (prepared from the hydrochloride salt obtained above in part (b) by neutralization with sodium hydroxide and extraction with ether) to react with n-propylmagnesium bromide according to the manipulative procedure described below in Example 2, part (c).

*Example 2*

(a) N - (n - dodecyl) - 2 - methyl - 1,3 - dihydroxy - 2 - propylamine [I; R is H, R' is $CH_3(CH_2)_{11}$, R'' is $CH_3$] was prepared from 52.26 g. of n-dodecyl bromide and 52.50 g. of 2-amino-2-methyl-1,3-propanediol in 500 ml. of n-butyl alcohol according to the manipulative procedure described above in Example 1, part (a). The product was recrystalilzed first from ethanol and then twice from acetone to give 24.75 g. of N-(n-dodecyl)-2-methyl-1,3-dihydroxy-2-propylamine, M.P. 50.8–53.6° C. (corr.).

Analysis.—Calcd. for $C_{16}H_{35}NO_2$: C, 70.28; H, 12.90; N, 5.12. Found: C, 70.68; H, 13.02; N, 5.05.

(b) 3 - (n - dodecyl) - 4 - hydroxymethyl - 4 - methyloxazolidine [III; R' is $CH_3(CH_2)_{11}$, R'' is $CH_3$] was prepared from 18.75 g. of N-(n-dodecyl)-2-methyl-1,3-dihydroxy-2-propylamine and 2.35 g. of paraformaldehyde in 150 ml. of benzene according to the manipulative procedure described above in Example 1, part (b). The crude product was dissolved in acetone, the solution was filtered, and an excess of etheral hydrogen chloride was added to the filtrate, followed by additional ether to cause separation of the crystalline product (21.4 g., M.P. 69–72° C. (uncorr.)). The latter material was recrystallized from a methanol-ether mixture, then from ethyl acetate and several more times from methanol-ether, and dried for eight hours in vacuo at 56° C. to give a sample of 3-(n-dodecyl)-4-hydroxymethyl-4-methyloxazolidine in the form of its hydrochloride salt having the M.P. 66.4–70.0° C. (corr.).

Analysis.—Calcd. for $C_{17}H_{35}NO_2 \cdot HCl$: C, 63.42; H, 11.27; N, 4.35. Found: C, 63.39; H, 11.32; N, 4.40.

3 - (n - dodecyl) - 4 - hydroxymethyl - 4 - methyloxazolidine hydrochloride was found to be bactericidally effective at a dilution of 1:20,000 vs. *Staphylococcus aureus* and 1:13,000 vs. *Eberthella typhi*.

(c) N - (n - dodecyl) - N - ethyl - 1,3 - dihydroxy - 2 - methyl-2-propylamine [I; R is $C_2H_5$, R' is $CH_3(CH_2)_{11}$, $R_2'$ is $CH_3$].—A Grignard reagent was prepared from 3.32 g. (0.137 mole) of magnesium and 19.40 g. (0.137 mole) of methyl iodide in 100 ml. of anhydrous ether. 3 - (n - dodecyl) - 4 - hydroxymethyl - 4 - methyloxazolidine hydrochloride (10.38 g., 0.323 mole) was dissolved in a minimum amount of water and an excess of 50% sodium hydroxide solution was added. The free base was extracted three times with chloroform, and chloroform extracts were dried by passage through filter paper and by standing in contact with anhydrous calcium sulfate. The extracts were concentrated and traces of moisture were removed by adding dry benzene, boiling off the benzene and repeating the process. The residue was dissolved in 150 ml. of absolute ether, and the solution was added dropwise to the Grignard reagent over a period of one-half hour. The reaction mixture was refluxed for four hours and then hydrolyzed with dilute sulfuric acid, whereupon three layers separated, a top ether layer, a middle layer of the insoluble sulfate salt of the desired product, and a lower aqueous phase. The ether layer was separated and washed with dilute sulfuric acid and with water. The aqueous washings were combined with the middle layer and the lower aqueous layer, and the whole was extracted five times with chloroform. The chloroform extracts were washed three times with concentrated ammonium hydroxide solution, dried over anhydrous calcium sulfate and concentrated to remove the solvent. The residue was distilled at 134° C. (0.0001 m.) to give 4.80 g. of N-(dodecyl)-N-ethyl-1,3-dihydroxy-2-methyl-2-propylamine, $n_D^{25}=1.4674$.

Analysis.—Calcd. for $C_{18}H_{39}NO_2$: C, 71.69; H, 13.04; O, 10.61. Found: C, 71.44; H, 12.90; O, 10.65.

N-(n-dodecyl)-N-ethyl-1,3-dihydroxy - 2 - methyl -2-propylamine was found to be bactericidally effective at a dilution of 1:7200 vs. *Staphylococcus aureus* and 1:10,700, vs. *Eberthella typhi*.

By replacement of the methyl iodide in the preceding preparation by a molar equivalent amount of ethyl bromide, n-propyl bromide, isopropyl bromide, n-butyl bromide, or n-pentyl bromide, there can be obtained, respectively, N-(n-dodecyl)-N-(n-propyl) - 1,3 - dihydroxy-2-methyl-2-propylamine [I; R is $CH_3(CH_2)_2$, R' is $CH_3(CH_2)_{11}$, R'' is $CH_3$]; N-(n-dodecyl)-N-(n-butyl)-1,3-dihydroxy-2-methyl-2-propylamine [I; R is $CH_3(CH_2)_3$, R' is $CH_3(CH_2)_{11}$, R'' is $CH_3$]; N-(n-dodecyl)-N-isobutyl-1,3-dihydroxy-2-methyl - 2 - propylamine [I; R is $(CH_3)_2CHCH_2$, R' is $CH_3(CH_2)_{11}$, R'' is $CH_3$]; N-(n-dodecyl)-N-(n-pentyl) - 1,3 - dihydroxy-2-methyl-2-propylamine [I; R is $CH_3(CH_2)_4$, R' is $CH_3(CH_2)_{11}$, R'' is $CH_3$]; or N-(n-dodecyl)-N-(n-hexyl)-1,3-dihydroxy-2-methyl-2-propylamine [I; R is $CH_3(CH_2)_5$, R' is $CH_3(CH_2)_{11}$, R'' is $CH_3$].

*Example 3*

(a) N-(n-tetradecyl)-2-methyl-1,3-dihydroxy-2-propylamine [I; R is H, R' is $CH_3(CH_2)_{13}$, R'' is $CH_3$] was prepared from 57.86 g. of n-tetradecyl bromide and 52.50 g. of 2-amino-2-methyl-1,3-propanediol in 500 ml. of n-butyl alcohol according to the manipulative procedure described above in Example 1, part (a). The solid product was recrystallized from ethanol to give 37.8 g. of N-(n-tetradecyl)-2-methyl-1,3-dihydroxy - 2 - propylamine, M.P. 55–57° C. (uncorr.). The latter material was recrystallized several times from acetone and finally from methanol to give a sample having the M.P. 55.4–57.6° C. (corr.).

Analysis.—Calcd. for $C_{18}H_{39}NO_2$: N, 4.65; O, 10.61. Found: N, 4.57; O, 10.40.

N-(n-tetradecyl)-2-methyl-1,3-dihydroxy - 2 - propylamine was found to be bactericidally effective at a dilution of 1:25,000 vs. *Staphylococcus aureus* and 1:10,500 vs. *Eberthella typhi*.

N-(n-tetradecyl)-2-methyl-1,3-dihydroxy - 2 - propylamine can be caused to react with hydrochloric acid, hydrobromic acid, hydriodic acid, nitric acid, sulfuric acid, phosphoric acid, acetic acid, propionic acid, lactic acid, quinic acid, phthalic acid, methanesulfonic acid, or p-toluenesulfonic acid to give, respectively, the hydrochloride, hydrobromide, hydroiodide, nitrate, sulfate (or bisulfate), phosphate (or acid phosphate), acetate, propionate, lactate, quinate, phthalate, methanesulfonate, or p-toluenesulfonate salts.

By replacement of the 2-amino-2-methyl-1,3-propanediol in the preceding preparation by a molar equivalent amount of 2-amino-2-ethyl-1,3-propanediol, 2-amino-2-(n-propyl)-1,3-propanediol, 2-amino-2-isopropyl-1,3-propanediol, 2-amino-2-(n-butyl) - 1,3 - propanediol, or 2-amino-2-(n-pentyl)-1,3-propanediol, there can be obtained, respectively, N-(n-tetradecyl)-2-ethyl-1,3-dihydroxy-2-propylamine [I; R is H, R' is $CH_3(CH_2)_{13}$, R" is $C_2H_5$]; N-(n-tetradecyl)-2-(n-propyl)-1,3-dihydroxy-2-propylamine [I; R is H, R' is $CH_3(CH_2)_{13}$, R" is $CH_3(CH_2)_2$]; N-(n-tetradecyl)- 2-isopropyl - 1,3 - dihydroxy-2-propylamine [I; R is H, R' is $CH_3(CH_2)_{13}$, R" is $(CH_3)_2CH$]; N-(n-tetradecyl) - 2 - (n-butyl)-1,3-dihydroxy-2-propylamine [I; R is H, R' is $CH_3(CH_2)_{13}$, R" is $CH_3(CH_2)_3$]; or N-(n-tetradecyl)-2-(n-pentyl)-1,3-dihydroxy-2-propylamine [I; R is H, R' is $CH_3(CH_2)_{13}$, R" is $CH_3(CH_2)_4$].

N-(n-tetradecyl) - 2 - methyl-1,3-dihydroxy-2-propylamine can be caused to react with methyl benzenesulfonate by heating in the presence of sodium carbonate in n-butanol solution to give N-(n-tetradecyl)-N-methyl-2-methyl-1,3-dihydroxy-2-propylamine [I; R is $CH_3$, R' is $CH_3(CH_2)_{13}$, R" is $CH_3$].

(b) *3-(n-tetradecyl)-4-hydroxymethyl-4-methyloxazolidine* [III; R' is $CH_3(CH_2)_{13}$, R" is $CH_3$] was prepared from 17.7 g. of N-(n-tetradecyl)-2-methyl-1,3-dihydroxy-2-propylamine and 2.02 g. of paraformaldehyde in 100 ml. of dry benzene according to the manipulative procedure described above in Example 1, part (b). There was thus obtained 17.7 g. of 3-(n-tetradecyl)-4-hydroxymethyl-4-methyloxazolidine, M.P. 42.0-45.4° C. (corr.), when recrystallized from acetone.

*Analysis.*—Calcd. for $C_{19}H_{39}NO_2$: N, 4.47; O, 10.21. Found: N, 4.39; O, 10.40.

By replacement of the N-(n-tetradecyl)-2-methyl-1,3-dihydroxy-2-propylamine in the preceding preparation by a molar equivalent amount of N-(n-tetradecyl)-2-ethyl - 1,3 - dihydroxy - 2 - propylamine, N-(n-tetradecyl)-2-(n-propyl)-1,3-dihydroxy-2-propylamine, N-(n-tetradecyl) - 2 - isopropyl-1,3-dihydroxy-2-propylamine, N-(n-tetradecyl)-2-(n-butyl)-1,3-dihydroxy - 2 - propylamine, or N-(n-tetradecyl)-2-(n-pentyl)-1,3-dihydroxy-2-propylamine, there can be obtained, respectively, 3-(n-tetradecyl)-4-hydroxymethyl-4-ethyloxazolidine [III; R' is $CH_3(CH_2)_{13}$, R" is $C_2H_5$]; 3-(n-tetradecyl)-4-hydroxymethyl - 4 - (n - propyl) - oxazolidine (III; R' is $CH_3(CH_2)_{13}$, R" is $CH_3(CH_2)_2$]; 3-(n-tetradecyl)-4-hydroxymethyl - 4 - isopropyloxazolidine [III; R' is $CH_3(CH_2)_{13}$, R" is $(CH_3)_2CH$]; 3-(n-tetradecyl)-4-hydroxymethyl - 4 - (n - butyl)oxazolidine [III; R' is $CH_3(CH_2)_{13}$, R" is $CH_3(CH_2)_3$]; or 3-(n-tetradecyl)-4-hydroxymethyl - 4 - (n-pentyl)oxazolidine [III; R' is $CH_3(CH_2)_{13}$, R" is $CH_3(CH_2)_4$].

(c) *N-(n-tetradecyl)-N-ethyl-1,3-dihydroxy-2-methyl-2-propylamine* [I; R is $C_2H_5$, R' is $CH_3(CH_2)_{13}$, R" is $CH_3$] was prepared from 10.55 g. of 3-(n-tetradecyl)-4-hydroxymethyl-4-methyloxazolidine and the Grignard reagent prepared from 3.07 g. of magnesium and 17.95 g. of methyl iodide according to the manipulative procedure described above in Example 2, part (c). There was thus obtained 5.82 g. of N-(n-tetradecyl)-N-ethyl-1,3-dihydroxy-2-methyl-2-propylamine in crystalline form which when recrystallized twice from ethyl acetate and dried at 25° C. for twenty-four hours had the M.P. 30.3-327.7° C. (corr.).

*Analysis.*—Calcd. for $C_{20}H_{43}NO_2$: C, 72.88; H, 13.15; N, 4.25. Found: C, 72.99; H, 12.77; N, 4.22.

N-(n-tetradecyl)-N-ethyl-1,3-dihydroxy - 2 - methyl-2-propylamine was found to be bactericidally effective at a dilution of 1:11,700 vs. *Staphylococcus aureus* and 1:6800 vs. *Eberthella typhi*.

By replacement of the 3-(n-tetradecyl)-4-hydroxymethyl-4-methyloxazolidine in the preceding preparation by a molar equivalent amount of 3-(n-tetradecyl)-4-hydroxymethyl-4-ethyloxazolidine, 3-(n-tetradecyl)-4-hydroxymethyl-4-(n-propyl)-oxazolidine, 3-(n-tetradecyl)-4-hydroxymethyl-4-isopropyl-oxazolidine, 3-(n-tetradecyl)-4-hydroxymethyl-4-(n-butyl)-oxazolidine, or 3-(n-tetradecyl) - 4 - hydroxymethyl - 4 - (n - pentyl) - oxazolidine, there can be obtained, respectively, N-(n-tetradecyl) - N - ethyl - 1,3 - dihydroxy - 2 - ethyl - 2 - propylamine [I; R is $C_2H_5$, R' is $CH_3(CH_2)_{13}$, R" is $C_2H_5$]; N - (n - tetradecyl) - N - ethyl - 1,3 - dihydroxy - 2 - (n-propyl)-2-propylamine [I; R is $C_2H_5$, R' is $CH_3(CH_2)_{13}$, R" is $CH_3(CH_2)_2$]; N-(n-tetradecyl)-N-ethyl-1,3-dihydroxy-2-isopropyl-2-propylamine [I; R is $C_2H_5$, R' is $CH_3(CH_2)_{13}$, R" is $(CH_3)_2CH$]; N-(n-tetradecyl)-N-ethyl - 1,3 - dihydroxy - 2 - (n - butyl) - 2 - propylamine [I; R is $C_2H_5$, R' is $CH_3(CH_2)_{13}$, R" is $CH_3(CH_2)_3$]; or N - (n - tetradecyl) - N - ethyl - 1,3 - dihydroxy - 2 - (n-pentyl)-2-propylamine [I; R is $C_2H_5$, R' is $CH_3(CH_2)_{13}$, R" is $CH_3(CH_2)_4$].

*Example 4*

(a) *N-(n-hexadecyl)-2-methyl-1,3-dihydroxy-2-propylamine* [I; R is H, R' is $CH_3(CH_2)_{15}$, R" is $CH_3$] was prepared from 60.6 g. of n-hexadecyl bromide and 45.5 g. of 2-amino-2-methyl-1,3-propanediol in 500 ml. of n-butyl alcohol according to the manipulative procedure described above in Example 1, part (a). The crude product was purified by dissolving it in dilute sulfuric acid, filtering the solution and reprecipitating the product with ammonium hydroxide, and finally recrystallizing it from ethanol to give 51.8 g. of N-(n-hexadecyl)-2-methyl-1,3-dihydroxy-2-propylamine, M.P. 54-60° C. (uncorr.). A sample of the compound was recrystallized again from ethanol and dried in vacuo for three hours at room temperature and five hours at 56° C., M.P. 62.2-64.4° C. (corr.).

*Analysis.*—Calcd for $C_{20}H_{43}NO_2$: C, 72.88; H, 13.15; N, 4.25. Found: C, 73.14; H, 12.90; N, 4.17.

N - (n - hexadecyl) - 2 - methyl - 1,3 - dihydroxy - 2-propylamine was found to be bactericidally effective at a dilution of 1:6300 vs. *Staphylococcus aureus* and 1:350 vs. *Eberthella typhi*..

(b) *3-(n-hexadecyl)-4-hydroxymethyl-4-methyloxazolidine* [III; R' is $CH_3(CH_2)_{15}$, R" is $CH_3$] was prepared from 35.0 g. of N-(n-hexadecyl)-2-methyl-1,3-dihydroxy-2-propylamine and 3.68 g. of paraformaldehyde in 200 ml. of dry benzene according to the manipulative procedure described above in Example 1, part (b). The product was recrystallized from acetone to give 30.85 g. of 3 - (n - hexadecyl) - 4 - hydroxymethyl - 4 - methyloxazolidine, M.P. 49-52° C. (uncorr.). Two more recrystallizations from acetone and a final recrystallization from methanol gave a sample with the M.P. 49.4-52.2° C. (corr.).

*Analysis.*—Calcd. for $C_{21}H_{43}NO_2$: N, 4.10; O, 9.37. Found: N, 4.04; O, 9.30.

(c) *N-(n-hexadecyl)-N-ethyl-1,3-dihydroxy-2-methyl-2-propylamine* [I; R is $C_2H_5$, R' is $CH_3(CH_2)_{15}$, R" is $CH_3$] was prepared from 17.88 g. of 3-(n-hexadecyl)-4-hydroxymethyl-4-methyloxazolidine and the Grignard reagent prepared from 4.78 g. of magnesium and 27.9 g. of methyl iodide according to the manipulative procedure described above in Example 2, part (c). In this instance 150 ml. of tetrahydrofuran was used as the solvent for the oxazolidine instead of ether. The product was recrystallized from ethyl acetate to give 11.2 g. of N-(n-hexadecyl) - N - ethyl - 1,3 - dihydroxy - 2 - methyl - 2-propylamine, M.P. 40.5–43° C. (uncorr.). Another recrystallization from ethyl acetate gave a sample having the M.P. 40.0–41.8° C. (corr.).

*Analysis.*—Calcd. for $C_{22}H_{47}NO_2$: C, 73.89; H, 13.25; N, 3.92. Found: C, 73.57; H, 13.20; N, 3.86.

N - (n - hexadecyl) - N - ethyl - 1,3 - dihydroxy - 2-methyl-2-propylamine was found to be bactericidally effective at a dilution of 1:4400 vs. *Staphylococcus aureus* and 1:1800 vs. *Eberthella typhi*.

Example 5

(a) *N-(n-octadecyl)-2-methyl-1,3-dihydroxy-2-propylamine* [I; R is H, R' is $CH_3(CH_2)_{17}$, R" is $CH_3$] was prepared from 66.6 g. of n-octadecyl bromide and 52.5 g. of 2-amino-2-methyl-1,3-propanediol in 500 ml. of n-butyl alcohol according to the manipulative procedure described above in Example 1, part (a). The product was recrystallized from methanol to give 61.3 g. of N-(n-octadecyl)-2-methyl-1,3-dihydroxy-2-propylamine, M.P. 67–68° C. (uncorr.). A sample when recrystallized from methanol and then from acetone and dried at 56° C. in vacuo had the M.P. 67.7–70.1° C. (corr.).

*Analysis.*—Calcd. for $C_{22}H_{47}NO_2$: C, 73.89; H, 13.25; N, 3.92. Found: C, 74.06; H, 12.90; N, 3.84.

(b) *3-(n-octadecyl)-4-hydroxymethyl-4-methyloxazolidine* [III; R' is $CH_3(CH_2)_{17}$, R" is $CH_3$] was prepared from 37.9 g. of N-(n-octadecyl)-2-methyl-1,3-dihydroxy-2-propylamine and 3.65 g. of paraformaldehyde in 200 ml. of dry benzene according to the manipulative procedure described above in Example 1, part (b). The product was recrystallized from acetone to give 37.0 g. of 3 - (n - octadecyl) - 4 - hydroxymethyl - 4 - methyloxazolidine, M.P. 54–56° C. (uncorr.). A sample when recrystallized from acetone and finally from methanol had the M.P. 52.2–54.6° C. (corr.).

*Analysis.*—Calcd. for $C_{23}H_{47}NO_2$: C, 74.74; H, 12.82; N, 3.79. Found: C, 74.76; H, 12.70; N, 3.80.

3 - (n - octadecyl) - 4 - hydroxymethyl - 4 - methyloxazolidine was found to be bactericidally effective at a dilution of greater than 1:10,000 vs. *Staphylococcus aureus* and *Eberthella typhi*.

(c) *N-(n-octadecyl)-N-ethyl-1,3-dihydroxy-2-methyl-2-propylamine* [I; R is $C_2H_5$, R' is $CH_3(CH_2)_{17}$, R" is $CH_3$] was prepared from 14.0 g. of 3-(n-octadecyl)-4-hydroxymethyl-4-methyloxazolidine and the Grignard reagent prepared from 3.93 g. of magnesium and 23.0 g. of methyl iodide according to the manipulative procedure described above in Example 2, part (c). The ether layer from the hydrolyzed reaction mixture was separated and extracted with 200 ml. of dilute sulfuric acid and then three times with concentrated ammonium hydroxide. The ether solution was dried over anhydrous calcium sulfate and concentrated to dryness. The residue was recrystallized from ethyl acetate to give 8.57 g. of N-(n-octadecyl) - N - ethyl - 1,3 - dihydroxy - 2 - methyl - 2-propylamine, M.P. 45–47° C. (uncorr.). After two recrystallizations from ethyl acetate and a final recrystallization from an ethyl acetate-hexane mixture there was obtained a sample having the M.P. 46.4–49.0° C. (corr.).

*Analysis.*—Calcd. for $C_{24}H_{51}NO_2$: C, 74.73; H, 13.32; N, 3.63. Found: C, 74.70; H, 13.00; N, 3.62.

Example 6

*N,N - di(n - heptyl) - 1,3 - dihydroxy - 2 - methyl - 2-propylamine* [I; R is $CH_3(CH_2)_6$, R' is $CH_3(CH_2)_6$, R" is $CH_3$].—n-Hexylmagnesium bromide was prepared from 41.25 g. (0.25 mole) of n-hexyl bromide and 6.08 g. (0.25 mole) of magnesium in 250 ml. of dry ether. After the preparation of the Grignard reagent was completed, a solution of 12.9 g. (0.10 mole) of 5-methyl-1-aza-3,7-dioxabicyclo[3.3.0]octane (II; R" is $CH_3$) in 250 ml. of dry ether was added over a period of fifteen minutes. The reaction mixture was refluxed for four hours, and then there was added 250 ml. of dilute sulfuric acid (equivalent to 30 ml. of concentrated sulfuric acid), and the mixture was stirred for fifteen minutes, whereupon three layers separated. The supernatant ether layer and the middle layer were washed twice with dilute sulfuric acid, the ether layer was discarded, and the remainder was made basic with concentrated ammonium hydroxide. The basic solution was extracted four times with chloroform, and the chloroform extracts were dried and concentrated. The residue was distilled at 133° C. (0.0002 mm.) to give 25.36 g. of N,N-di(n-heptyl)-1,3-dihydroxy-2-methyl-2-propylamine.

*Analysis.*—Calcd. for $C_{18}H_{39}NO_2$: C, 71.69; H, 13.04; N, 4.65. Found: C, 71.66; H, 12.80; N, 4.66.

Alternatively, N,N-di(n-heptyl)-1,3-dihydroxy-2-methyl-2-propylamine can be prepared by heating 2-amino-2-methyl-1,3-propanediol with between two and three molar equivalents of n-heptyl bromide in the presence of sodium carbonate in n-butyl alcohol solution.

By replacement of the n-hexyl bromide in the preceding preparation of a molar equivalent amount of n-octyl bromide or n-nonyl bromide, there can be obtained, respectively, N,N - di(n - nonyl) - 1,3 - dihydroxy - 2 - methyl-2-propylamine [I; R is $CH_3(CH_2)_8$, R' is $CH_3(CH_2)_8$, R" is $CH_3$]; or N,N-di(n-decyl)-1,3-dihydroxy-2-methyl-2-propylamine [I; R is $CH_3(CH_2)_9$, R' is $CH_3(CH_2)_9$, R" is $CH_3$].

Example 7

*N,N - di(n -octyl) - 1,3 - dihydroxy - 2 - methyl - 2-propylamine* [I; R is $CH_3(CH_2)_7$, R' is $CH_3(CH_2)_7$, R" is $CH_3$] was prepared from 12.90 g. of 5-methyl-1-aza-3,7-dioxabicyclo[3.3.0]octane and the Grignard reagent prepared from 44.75 g. of n-heptyl bromide and 6.08 g. of magnesium according to the manipulative procedure described above in Example 6. There was thus obtained 26.35 g. of N,N-di(n-octyl)-1,3-dihydroxy-2-methyl-2-propylamine, B.P. 139° C. (0.0003 mm.).

*Analysis.*—Calcd. for $C_{20}H_{43}NO_2$: C, 72.88; H, 13.15; N, 4.25. Found: C, 73.10; H, 13.40; N, 4.25.

N,N - di(n - octyl) - 1,3 - dihydroxy - 2 - methyl - 2-propylamine was found to be bactericidally effective at a dilution of 1:16,800 vs. *Staphylococcus aureus* and 1:3600 vs. *Eberthella typhi*.

N,N - di(n - octyl) - 1,3 - dihydroxy - 2 - methyl - 2-propylamine can be dissolved in aqueous acetic, propionic, quinic, or phthalic acids to produce solutions of the acetate, propionate, quinate, or phthalate salts, respectively.

This application is a division of my prior, copending application, Serial No. 732,436, filed May 2, 1958.

I claim:

1. A compound selected from the group consisting of (A) compounds having the formula

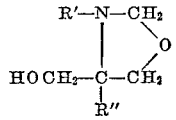

wherein R' represents an alkyl radical, R" represents a lower-alkyl radical, and the sum of the number of carbon atoms in R' and R" is between eleven and nineteen, inclusive; and (B) acid-addition salts thereof.

2. A compound having the formula

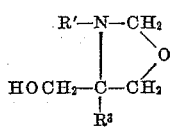

wherein R' represents an alkyl radical having between ten and eighteen carbon atoms, inclusive.

3. 3 - (n - decyl) - 4 - hydroxymethyl - 4 - methyloxazolidine.

4. 3 - (n - dodecyl) - 4 - hydroxymethyl - 4 - methyloxazolidine.

5. 3 - (n - tetradecyl) - 4 - hydroxymethyl - 4 - methyloxazolidine.
6. 3 - (n - hexadecyl) - 4 - hydroxymethyl - 4 - methyloxazolidine.
7. 3 - (n - octadecyl) - 4 - hydroxymethyl - 4 - methyloxazolidine.
8. The process for preparing a compound having the formula

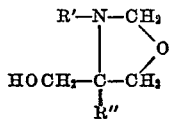

wherein R' represents an alkyl radical, R" represents a lower-alkyl radical, and the sum of the number of carbon atoms in R' and R" is between eleven and nineteen, inclusive, which comprises heating an amine having the formula R'NHC(R")(CH$_2$OH)$_2$ and formaldehyde, with means for separating the water formed in the reaction.

References Cited in the file of this patent

Senkus: J. Am. Chem. Soc., vol. 67, pp. 1515–1519 (1945).

UNITED STATES PATENT OFFICE
CERTIFICATION OF CORRECTION

Patent No. 2,964,530                                December 13, 1960

Bernard L. Zenitz

It is hereby certified that error appears in the above numbered patent requiring correction and that the said Letters Patent should read as corrected below.

Column 3, line 25, for "wehreupon" read -- whereupon --; column 4, line 5, for "$R_2'$" read -- $R''$ --; line 33, for "(0.0001 m.)" read -- (0.0001 mm.) --; column 6, line 1, for "30.3-327.7°" read -- 30.3-32.7° --.

Signed and sealed this 9th day of May 1961.

(SEAL)
Attest:

ERNEST W. SWIDER                                      DAVID L. LADD
Attesting Officer                                           Commissioner of Patents

UNITED STATES PATENT OFFICE
CERTIFICATION OF CORRECTION

Patent No. 2,964,530            December 13, 1960

Bernard L. Zenitz

It is hereby certified that error appears in the above numbered patent requiring correction and that the said Letters Patent should read as corrected below.

Column 8, lines 64 to 69, the formula should appear as shown below instead of as in the patent:

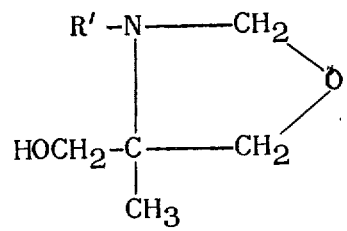

Signed and sealed this 12th day of June 1962.

(SEAL)
Attest:

ERNEST W. SWIDER
Attesting Officer

DAVID L. LADD
Commissioner of Patents